United States Patent
Goldman et al.

(10) Patent No.: US 7,149,147 B1
(45) Date of Patent: Dec. 12, 2006

(54) SYSTEM AND METHOD FOR SOUND DETECTION AND IMAGE USING A ROTOCRAFT ACOUSTIC SIGNATURE

(75) Inventors: Geoffrey H. Goldman, Ellicott City, MD (US); Tung-Duong Tran-Luu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 289 days.

(21) Appl. No.: 10/932,252

(22) Filed: Sep. 2, 2004

(51) Int. Cl.
*G01S 15/89* (2006.01)
(52) U.S. Cl. .................................................. 367/88
(58) Field of Classification Search ............... 367/88, 367/11
See application file for complete search history.

(56) References Cited

U.S. PATENT DOCUMENTS

| | | | |
|---|---|---|---|
| 4,719,606 A * | 1/1988 | Andrieu | 367/135 |
| 5,053,778 A | 10/1991 | Imhoff | 342/191 |
| 5,189,424 A | 2/1993 | Brown | 342/25 |
| 5,200,931 A | 4/1993 | Kosalos et al. | 367/88 |
| 6,388,607 B1 | 5/2002 | Woodell | 342/26 |
| 6,594,200 B1 | 7/2003 | Nakamura | 367/88 |

\* cited by examiner

*Primary Examiner*—Dan Pihulic
(74) *Attorney, Agent, or Firm*—Edward L. Stolarun

(57) ABSTRACT

One embodiment of the system is implemented as an aircraft comprising a rotor. For example, the aircraft may be a helicopter. This embodiment also comprises an acoustic source, wherein this acoustic source comprises an acoustic signature of the aircraft. This particular embodiment also comprises an acoustic collection device affixed to the aircraft. The acoustic collection device preferably comprises an array of microphones. Finally, this embodiment also has a data processing device, such as a computer, for collecting the data detected by the microphones and processing this data. In operation, the aircraft is flown for a distance along a path while the aircraft emits acoustic energy. Then, the microphones detect the acoustic energy that is reflected off the terrain. Optionally, the detected energy may be stored as data and processed, so that noise may be reduced and a terrain image may be formed.

22 Claims, 12 Drawing Sheets

SYSTEM AND METHOD FOR SOUND DETECTION AND IMAGE USING A ROTORCRAFT ACOUSTIC SIGNATURE

GOVERNMENT INTEREST

The invention described herein may be manufactured, used, and licensed by or for the United States Government.

BACKGROUND

1. Technical Field

The present invention is generally related to terrestrial imaging and, more particularly, is related to a method and apparatus for imaging terrain via synthetic aperture sound detection and imaging from the acoustic signature of a rotorcraft, such as, for example, a helicopter.

2. Description of the Related Art

Various applications, industries, endeavors, and studies require the ability of a person or device to accurately map the earth's terrain. In some specific applications of terrain mapping technology it is necessary not only to map terrain, but also to use terrain mapping technology to detect specific terrain features, or to detect certain objects on the terrain. For example, a military may wish to find and destroy military targets such as tanks and mobile missile launchers that can be hidden under foliage. The ability to accurately locate and image such objects would greatly assist this goal.

Traditionally, terrain mapping has been accomplished by using RADAR imaging. For example, in military target imaging applications, a standard approach for imaging targets under foliage is to use an ultra wide band radar. The concept of RADAR imaging is usually considered relatively simple: project microwave radiation at the terrain to be imaged and detect the reflected energy with an antenna. It is often it is desirable to maximize the resolution of standard RADAR imaging. One factor that can limit the resolution of a given RADAR system is the size of the antenna. Therefore, one way to achieve increased resolution is to increase the size of the antenna. Because of various constraints, it is not be practical to increase the size of an antenna beyond some finite point.

Scientists developed a technique called Synthetic Aperture RADAR ("SAR") to assist in resolving the limitation of inadequate antenna size. The idea behind SAR is to mount an antenna on a structure and fly the antenna along a path. As the flying structure, such as an aircraft, travels along its path, it emits a wide beam of microwave radiation. The antenna on the aircraft collects the energy reflected. Then, the various data sets are combined to form an image with higher crossrange resolution than with a real-beam system. In essence, the size of the antenna has been increased "synthetically."

One problem with using SAR for terrain imaging is the high cost of radar systems. For this reason, there is typically a limited number of aircraft equipped for terrain imaging. It would be desirable to have a lower cost alternative to using SAR for terrain imaging. This would permit a greater number of aircraft to be equipped for terrain imaging.

In addition to RADAR, there are other technologies that utilize acoustic waves to gain information about the location or position of objects or structures. As is known, SONAR is a technology widely used for underwater imaging. SONAR uses the propagation of sound waves through a water medium to detect the location of objects and to image those objects. Specifically, a source of sound waves emits acoustic waves into the water. Then, a receiver, typically on the same object as the source, detects the returning acoustic energy in order to map the underwater terrain, or locate an object.

Similar to SONAR, another known type of technology used for a rudimentary type of imaging is Sound Detection and Ranging ("SODAR"). SODAR is similar to SONAR in that it uses acoustical energy. However, SODAR uses acoustic waves transmitted through air. SODAR has been used in the past to measure turbulence or other wind profiles in the earth's atmosphere by observing the acoustic energy reflection due to scattering by atmospheric turbulence. SODAR has not been used for any type of terrain mapping. Traditionally, SODAR has only been used to image weather patterns, wind, rain, and the like.

A heretofore unaddressed need exists in the industry to address the aforementioned deficiencies and inadequacies.

SUMMARY

Embodiments of the present invention provide a system and method for imaging terrain by using synthetic aperture sound detection and imaging techniques with a reflected acoustic signature of a rotorcraft.

Briefly described, in architecture, one embodiment of the system, among others, can be implemented as a system for generating a terrain image map. This one embodiment comprises an aircraft with a rotor, such as, for example, a helicopter. This embodiment also comprises an acoustic source, wherein this acoustic source comprises an acoustic signature of the aircraft. This particular embodiment also comprises an acoustic collection device affixed to the aircraft, and a data processing device for processing data collected by the acoustic collection device. The acoustic collection device may comprise, for example, an array of microphones affixed to a lower portion of the aircraft.

Embodiments of the present invention can also be viewed as providing methods for imaging a terrain with a rotorcraft through synthetic aperture sound detection and ranging techniques. In this regard, one embodiment of such a method, among others, can be broadly summarized by the following steps: (i) providing a rotorcraft; (ii) affixing an acoustic detection mechanism to the rotorcraft; (iii) flying the rotorcraft for a distance along a path, where the rotorcraft emits an acoustic energy; and (iv) detecting the acoustic energy that is reflected off the terrain with the acoustic detection mechanism.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The present disclosure is directed to a method and apparatus for generating terrain and object imagery. As a conceptual overview, one possible embodiment of the present disclosure involves generating terrain imagery by flying a helicopter with an array of microphones mounted below a body of the helicopter over a terrain having physical features or objects to be imaged. The microphones detect acoustical energy reflected by the terrain and process this information into an image of the terrain, or objects on the terrain.

As will be discussed in greater detail below, specific embodiments of the present disclosure may involve other devices and/or methods for accomplishing an imaging task, or collecting data for the imaging task.

Figure 1:
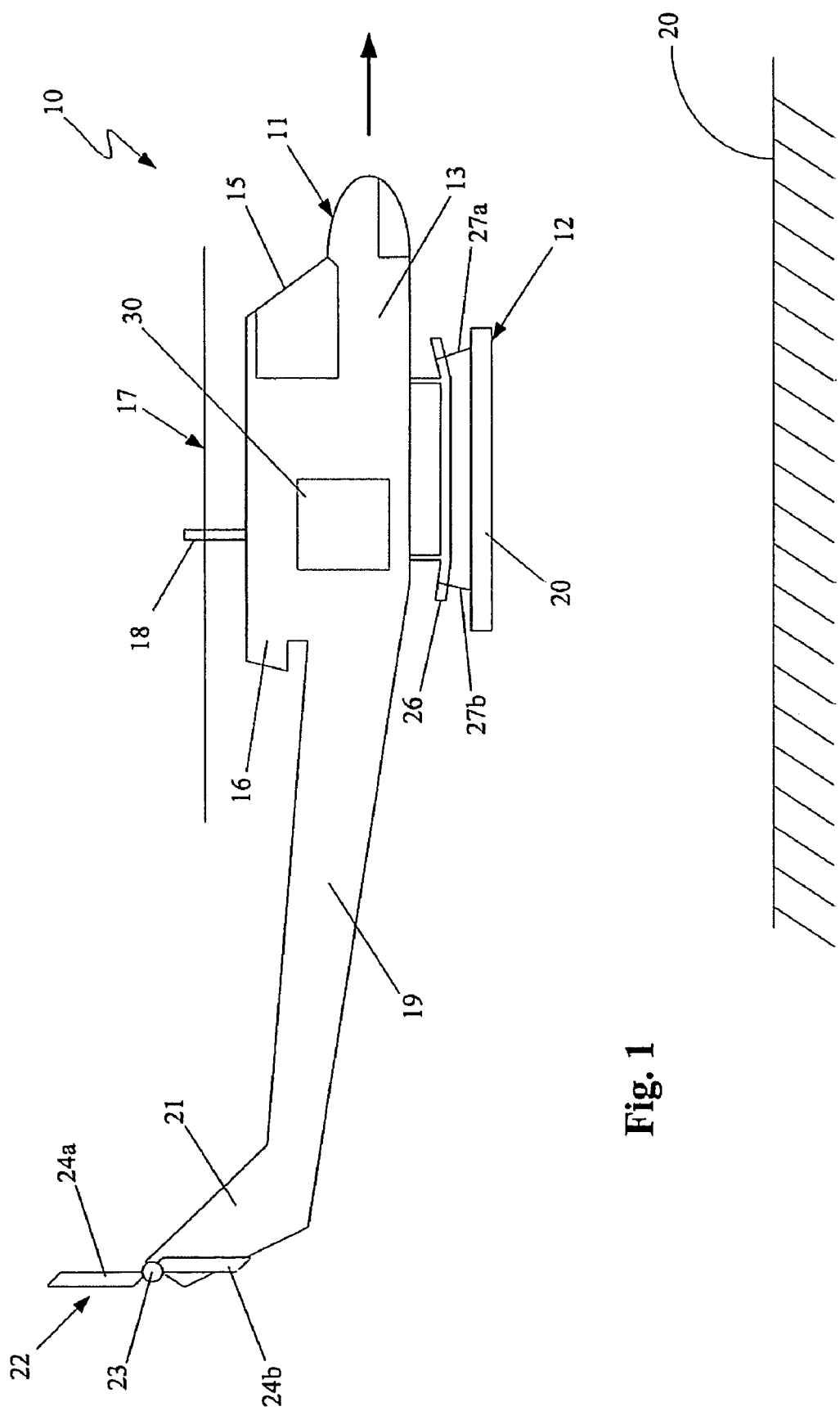
FIG. 1 is a side view of a helicopter of the first embodiment traveling over a terrain to be imaged according to the present disclosure.

FIG. 1 depicts a first embodiment 10 of an apparatus for accomplishing the disclosed method. As shown in FIG. 1, the first embodiment 10 comprises a helicopter 11 with a receiver array platform 12 mounted to the helicopter 11. The helicopter 11 of the presently-depicted embodiment generally comprises a main cabin, or body 13 with a windshield 15. The main cabin 13 also generally houses an engine 16, a pilot (not depicted), and other control and mechanical hardware (not depicted).

In addition to the main cabin 13, the helicopter 11 of the embodiment 10 also preferably comprises a main rotor 17 attached to the body 13 via a main rotor hub 18. As is known, the main rotor 17 of the helicopter 11 generally comprises a number of rotor blades (not individually depicted in FIG. 1). These rotor blades can be thought of a individual, three-dimensional "wings" that rotate around the rotor hub 18 at a selected speed and pitch.

Attached to a rear portion of the main cabin 13 is a tail boom 19 with a vertical tail structure 21. Attached to the vertical tail structure 21 is a tail rotor 22 attached via a tail rotor hub 23. As with the main rotor 17, the tail rotor 22 typically comprises a number of tail rotor blades 24a, 24b. As is common, the tail boom 19 typically houses a mechanical linkage (not depicted) and control structures (not depicted) necessary to connect the tail rotor 22 to the helicopter engine 16 in order to drive the tail rotor 22.

The helicopter 11 of the first embodiment 10 also comprises standard landing skids 26 with the platform 12 mounted thereto by a hooking mechanism 27a, b. Of course, landing skids 26 are not required by the present disclosure. For example, some helicopters are not equipped with landing skids and have, for example, wheels or pontoons. This does not change the present disclosure. The platform, for example, could be mounted directly to the body 13 of the helicopter 11 or to another landing structure.

In this embodiment 10, hooking mechanism 27a, b simply comprises metal straps with hooks to attach the platform 12 to the landing skids 26. Of course, other attachment devices could be used to secure the platform 12 to the helicopter body 13. For example, the platform 12 could be mounted directly to the helicopter 11. In another example, the platform could be designed to retract into the body 13 of the helicopter 11. As another example, the platform 12 could be formed as an integral part of the landing skid 26. Certainly, many other possible attachment mechanisms would be apparent to one of ordinary skill in the art and are included in the present disclosure.

As is known, the helicopter 11 depicted in FIG. 1 is generally the shape and construction of a UH-1 ("Huey") helicopter manufactured for the U.S. Army by the Bell Helicopter Corporation. This aircraft has been chosen for the present embodiment because of the relative ubiquity of the craft in the U.S. Army's helicopter fleet. However, another type of helicopter may be just as easily used with the present disclosure.

In fact, in a broader sense, any rotorcraft generally could be used. For example, the craft chosen to be used with the present disclosure could just as easily have multiple main rotors (such as the Boeing CH-46 "Sea Knight" or CH-47 "Chinook" helicopters), different numbers of main rotor blades (the "Huey" has two, the Aerospatiale HH-65 "Dolphin," for example, has 4, the Boeing RAH-66 "Comanche," for further example, has 5), a tilt-rotor (such as the V-22 "Osprey" and others), no tail rotor (such as the MD 520N "NOTAR" and others), or many other possible variations.

Figure 2:
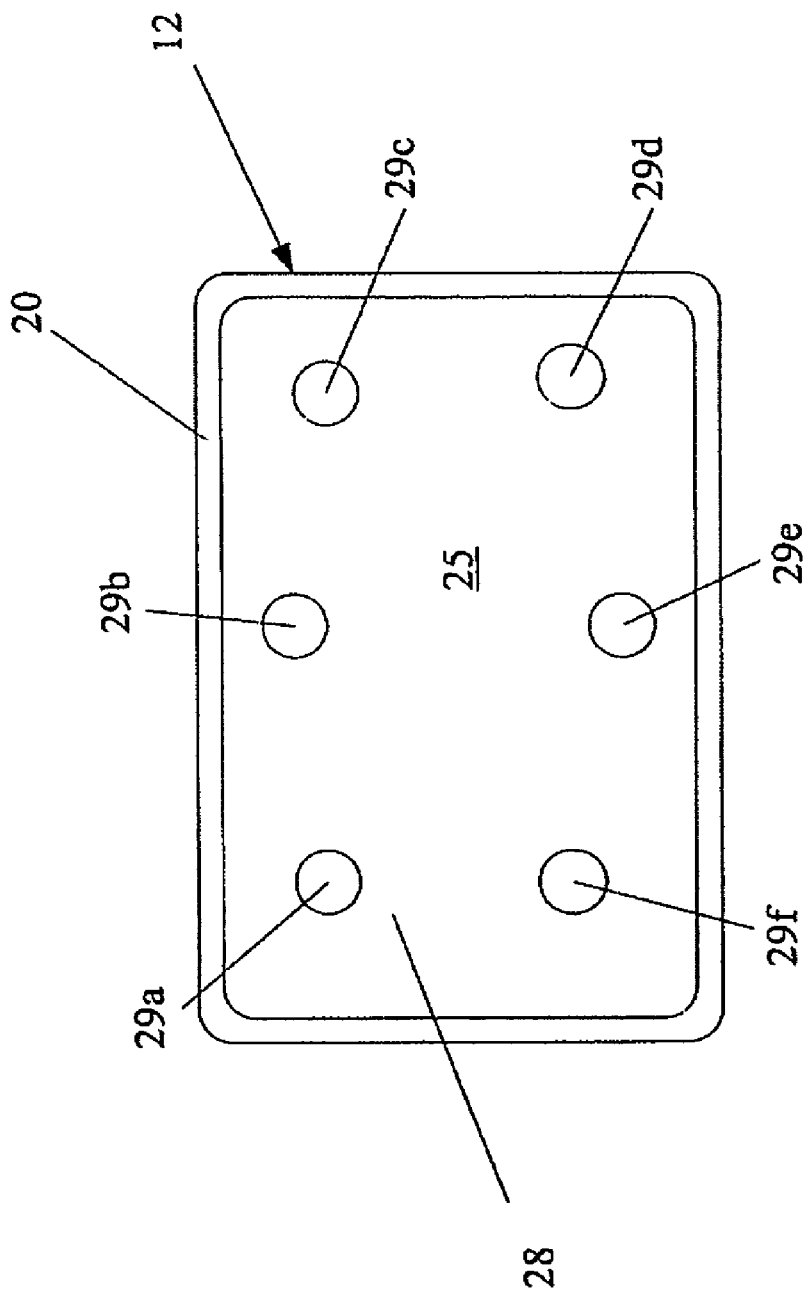
FIG. 2 is a plan form view of a lower side of a platform housing microphones for use by the helicopter of the first embodiment depicted in FIG. 1.

The receiver array platform 12 can be of any number of configurations. The basic goal in the depicted embodiment 10 is to provide a relatively sturdy platform 12 for a receiver array (not depicted in FIG. 1). FIG. 2 is a drawing from an underside 25 of the platform 12, depicting an array of receivers 28. As shown in FIG. 2, the receiver array 28 preferably comprises a number of microphones 29a–f.

In the present embodiment 10, the microphones 29a–f of the array 28 are standard acoustical noise receiving microphones with a large dynamic range. Typical a/d samples rates for the microphones 29a–f of the preferred embodiment 10 are 1–2 KHz with 24-bits of resolution. The sample rate is preferably at least two times larger than the highest significant frequency signal being emitted by the source of sound. Microphones with large dynamic range and high fidelity are provided by Bruel & Kjaer (B&K). B&K model 4166, for example, provides a dynamic range up to 157 dB with some nonlinear distortion after 146 dB. This may be beneficial in some instances because even with shielding, the source may saturate linear microphones and the signals to be detected will be lost.

The array of microphones 29a–f are mounted on the underside 25 of the platform 12 such that the microphones 29a–f are carried below the main cabin 13 of the helicopter 11, and pointed at a terrain 20 to be imaged.

The platform 12 preferably comprises a smooth planar member that will preferably not create additional air turbulences over the microphones. Each microphone is preferably embedded in a flow noise reduction windscreen (not depicted) to minimize wind noise. The present embodiment 10, for example, preferably uses windscreens developed by Scientific Applications & Research Associates, Inc., which have shown acceptable wind noise reduction at moderate speed. The platform 12 is preferably constructed from a rigid material so that the microphones 29a–f do not move relatively to each other. The platform 12 is preferably separated from the body 13 of the helicopter 11 with a vibration-damping material (not depicted)—although the particular preferred B&K microphones mentioned above already have a built-in anti-vibration mechanism. Generally, the platform 12 is designed in a rectangular shape, as viewed from below (FIG. 2). Of course, the platform 12 could be any number of different shapes. The shape of the platform 12, may, for example, be dictated by the number or placement of the microphones 29a–f, or the particular body style of the helicopter 11. One with ordinary skill in the art will readily be able to adapt the shape of the platform 12 as desired.

FIG. 2 depicts only one possible configuration for the microphones 29a–f comprising the receiver array 28. The depicted configuration of microphones 29a–f comprises, generally, two dissymmetrical arc configurations. This configuration has been selected for the present example in order to maximize the effective size of the aperture while shielding the microphones 29a–f from direct acoustical signals emitted by the main rotor 17 and the tail rotor 22. The microphones shown in FIG. 2. are spatially oversampling a reflected acoustical signal. The various noise sources have nonstationary spatially and temporal variations, so the noise can be reduced by oversampling.

Preferably, the helicopter 11 of the present embodiment 10 further comprises a data processing mechanism 30, such as a computer or other processor, in the main cabin 13 of the helicopter 11. The processor 30 is preferably used to fetch the received signals from analog-to-digital converters (not depicted) sampling data collected by the microphone array 28, store this information as data, and in some circumstances process the data to generate a real-time image of the terrain 20 over which the helicopter 11 is flying. The processing system 30 is also designed to receive other data from the helicopter 11, and potentially use this data in the processing and/or imaging phases. The processing of data collected by the processor 30, or some other computing device, will be described in more detail below.

Preferably, however, the computer 30 is simply used to receive data from the array of microphones 28 and store the data (preferably not in memory). Then, once the data is collected, and the helicopter 11 returns to a base site, the data is downloaded to a more powerful processing system for data processing and terrain imaging.

The helicopter 11 of the preferred embodiment 10 also comprises a global positioning system ("GPS") receiver (not depicted in FIG. 1), an inertial guidance system (not depicted in FIG. 1) in the main cabin 13 of the helicopter 11, and a pitot tube system (not depicted in FIG. 1). The combination of a GPS receiver and the information provided from an inertial guidance system ("IGS") permit computation of the helicopter 11 position, altitude, attitude, and velocity at any point in time. By comparing these results, to the relative velocity computed using the pitot tube system, the wind speed can be estimated. The wind speed is preferably used as a correction factor in the image formation algorithms, discussed below.

Figure 3:
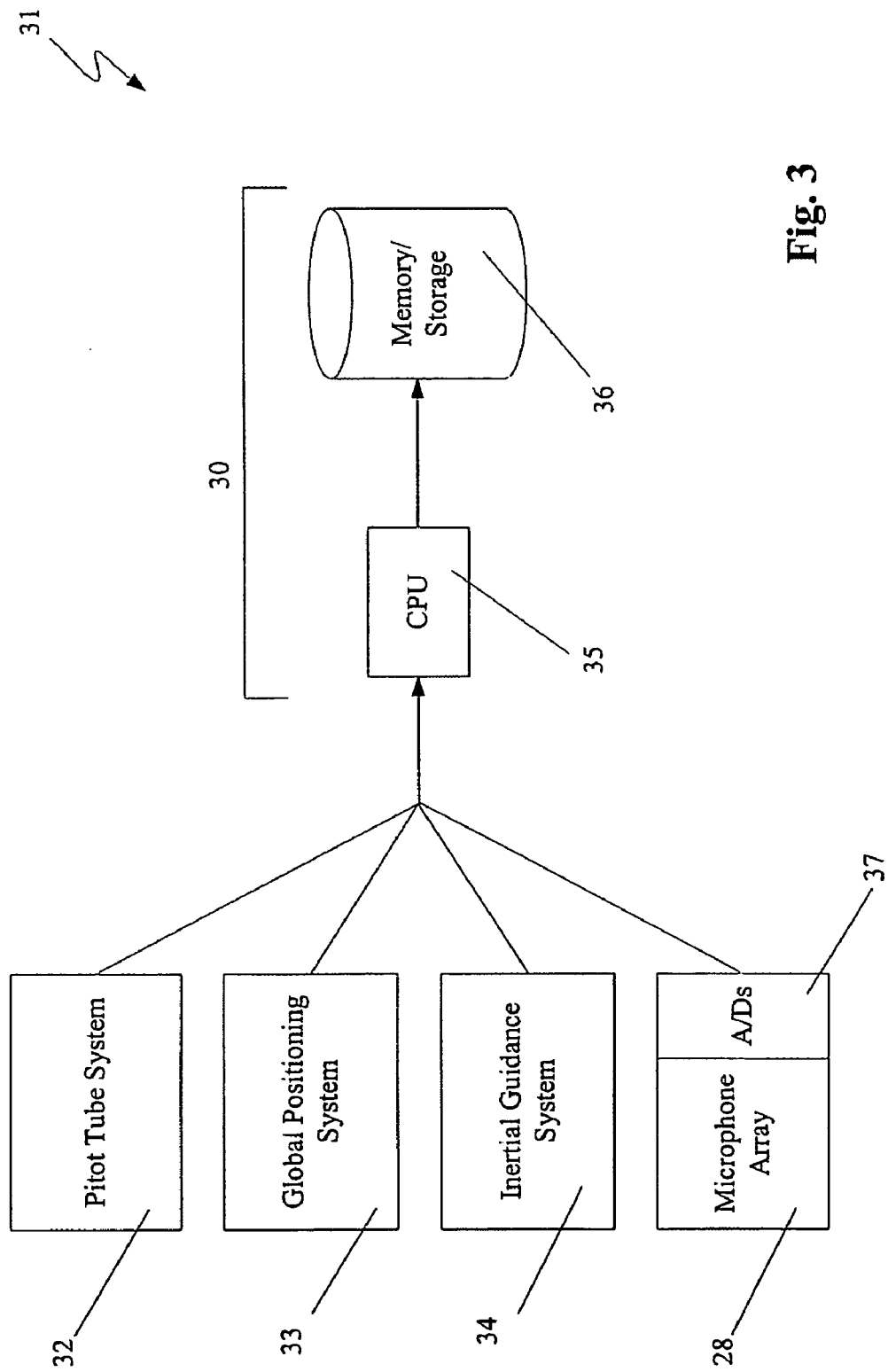
FIG. 3 is a flow chart depiction of a preferred flow of data collected by the helicopter of the first embodiment depicted in FIG. 1.

FIG. 3 depicts a preferred data flow 31 in the helicopter 11 during operation. Data produced by the pitot tube system 32, the GPS receiver 33, the IGS 34, and the analog-to-digital converter devices 37 sampling the microphone array 28 is preferably collected from these devices by the processor 30. As shown in FIG. 3, the processor 30 on the helicopter 11 preferably comprises a central processing unit ("CPU") 35 and a memory/storage 36. The processor 30 on the helicopter 11 preferably simply stores the data it receives from the GPS 33, the IGS 34, pitot tube system 32, and the microphone array 28 for later use in yielding the position, altitude, attitude, and velocity of the helicopter 11 at each point in time. The four preferred sources of data, of course, are preferably synchronized with each other as a function of time. In this way, a database 36 of information is preferably constructed that can be used for later processing and imaging.

The preferred method of operation involves a series of steps. Not all of the steps discussed below are necessary to perform the preferred method. Indeed, some of the steps may be omitted or replaced depending on the particular implementation of the embodiment disclosed herein. One having ordinary skill in the art, after reading the present description, will be able to determine which steps may be omitted, or additional steps to be added, in certain applications of the present embodiment.

Figure 4:
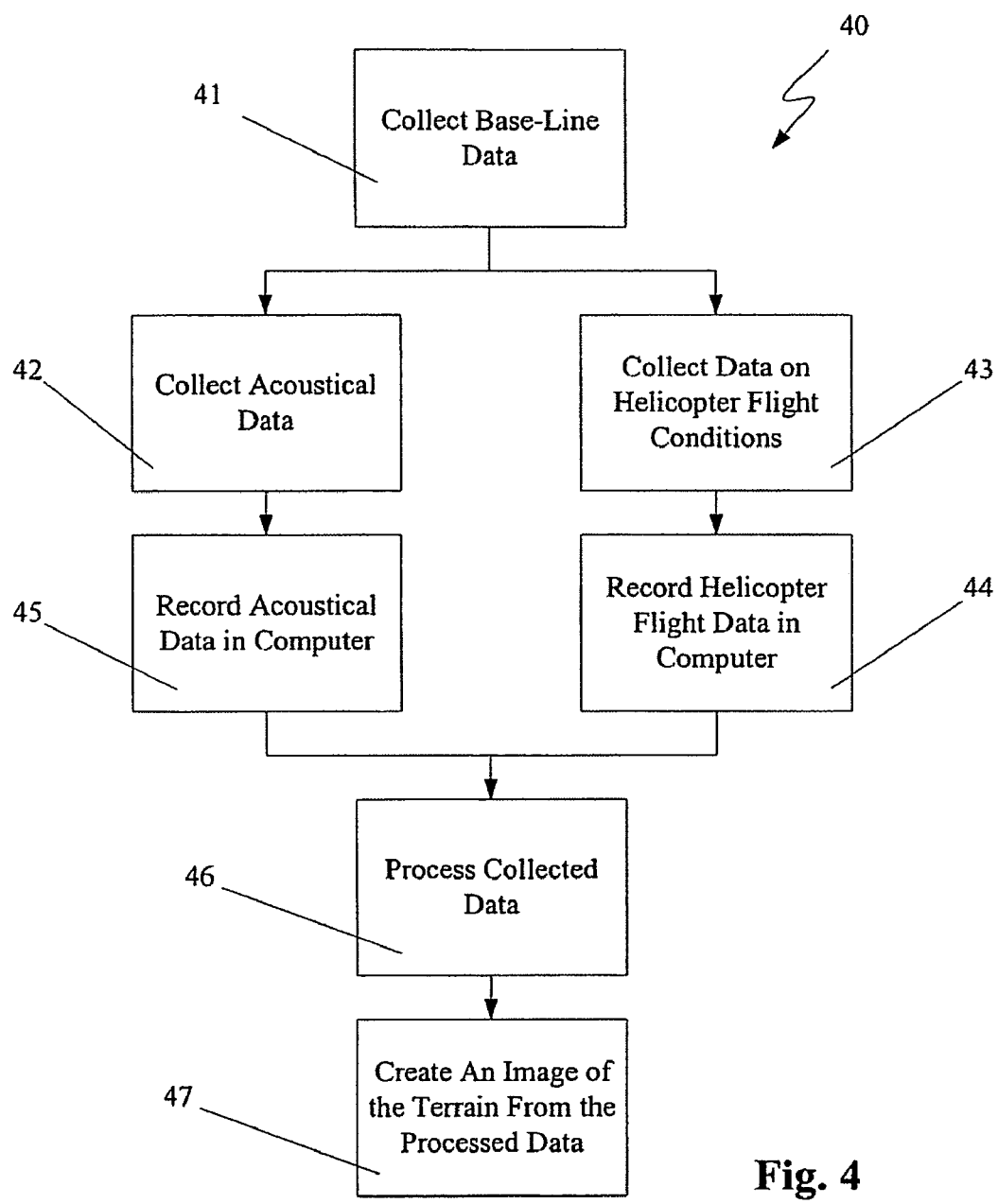
FIG. 4 is a flow chart of the preferred steps implementing a preferred method according to the present disclosure.

In a general sense, the preferred method 40 of using the first embodiment 10 depicted and described above is presented in FIG. 4. As shown in FIG. 4, the first step 41 of the preferred method 40 comprises collecting a set of "base-line" acoustical data. That is, before the device 10 and method 40 are employed to attempt to detect any ground-based object, or to attempt to map any terrain 20, a set of "normal," or standard, acoustical data is preferably collected and stored in a database 36. Preferably, this data is collected directly from sounds emitted from the helicopter 11 while operating, and not as reflected acoustical noise. Of course, in certain implementations, the "base-line" acoustical data may be collected from reflected acoustical noise, or from theoretical information regarding the theoretical acoustical signature of the helicopter 11.

Figure 5:
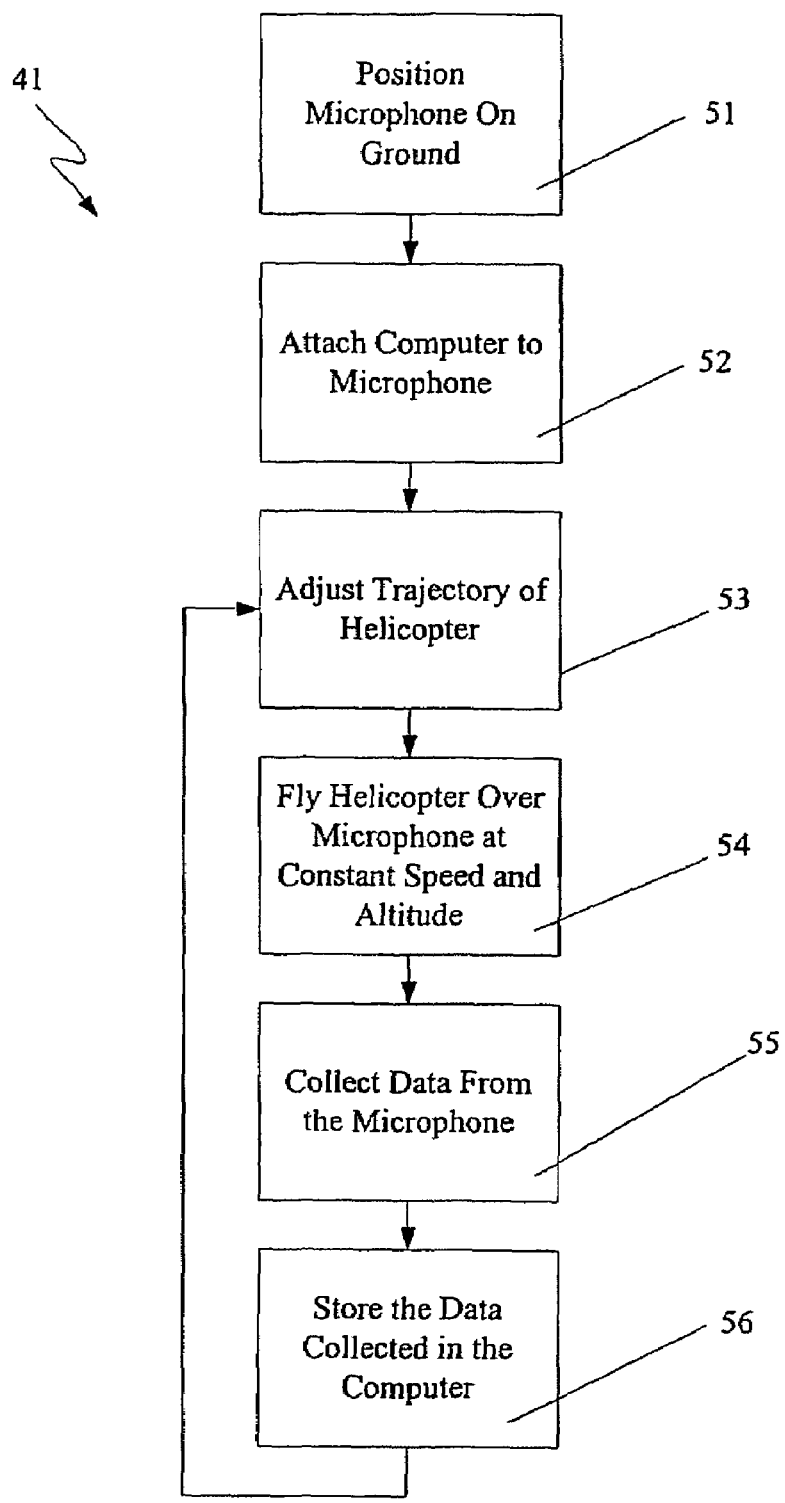
FIG. 5 is a flow chart of the preferred steps for collecting a baseline acoustical data.
Figure 6:
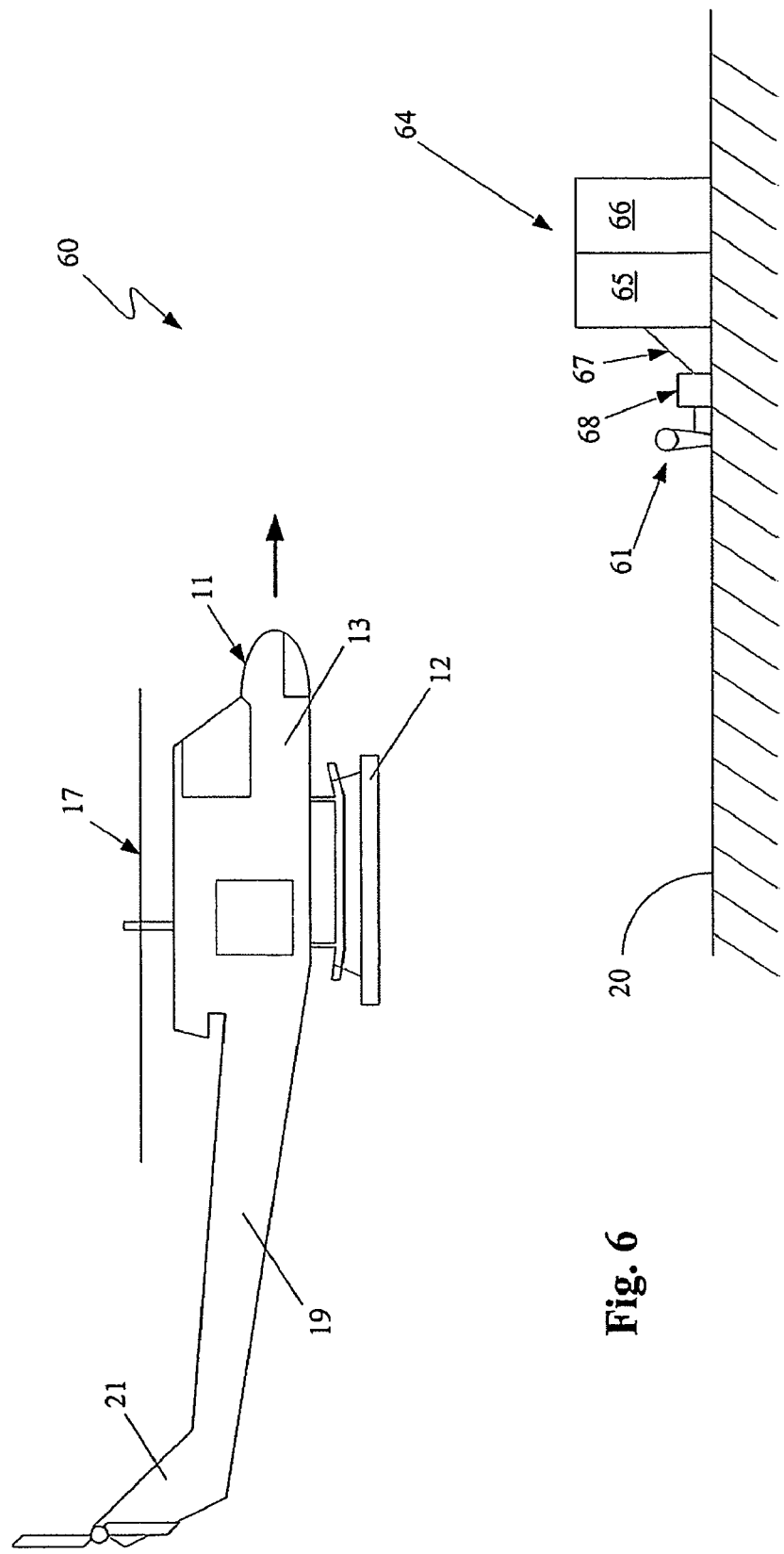
FIG. 6 is a side view of equipment preferably used in the collection of baseline data according to the preferred method steps depicted in FIG. 5.

FIG. 5 depicts the preferred sub-steps used to generate the "base-line" data 41. FIG. 6 depicts the physical embodiment 60 of the "base-line" collection procedure 41. As shown in FIG. 5, the first step of generating the "base-line" data 41 is preferably positioning a microphone on a ground 51. As shown in FIG. 6, a microphone 61 is preferably positioned on the ground 20.

The second step (52 in FIG. 5) in collecting the base-line data 41 is to attach the microphone 61 to a computer 64, as shown in FIG. 6. The computer 64 preferably comprises a CPU 65 and storage 66. The microphone 61 is electronically attached via wiring 67 to the computer 64 through an analog-to-digital converter 68.

As shown in FIG. 5, the next step 53 in the preferred method of collecting base line data 41 is to adjust a particular trajectory, or aspect angle, of the helicopter 11 relative to the microphone 61 on the ground 20. Then, the helicopter 11 is flown at the selected aspect angle over the stationary microphone 61 at a constant altitude and velocity (step 54). In the next step 55, the microphone 61 collects the acoustical data emitted by the helicopter 11 over time as the helicopter 11 passes the microphone 61. This data is, in turn, collected by the computer CPU 65. The data collected is stored in the memory 66 of the computer 64 (step 56) for analysis and use during the processing phase later.

After collecting this first set of data, the trajectory of the helicopter is adjusted to a different aspect angle (step 53), and the helicopter 11 repeats its flight over the microphone 61 (step 54). A new series of data is collected (step 55) and stored (step 56). This process is preferably repeated for a number of different helicopter aspect angles in order to generate a complete set of baseline data 41.

It is generally preferred to collect the "base-line" data because each class of helicopter or other rotorcraft emits a different acoustical signature. For example, as mentioned previously, various helicopters have different numbers of blades and different blade configurations. For at least this reason, the acoustical signature emitted from a given helicopter's blades will vary. Also, the acoustical signature may vary with speed and various other factors. This data will be used to estimate the spectral content and directivity of the acoustic signature emitted by the helicopter.

The process 41 of collecting the "base-line" data is basically an attempt to determine the frequency and aspect angle response of the amplitude of the acoustic pressure wave produced by the helicopter 11 to be used for data collection. For a U.S. Army UH-1 "Huey" helicopter, an example of collected "base-line" data is depicted in FIGS. 7A and 7B.

Figure 7A:
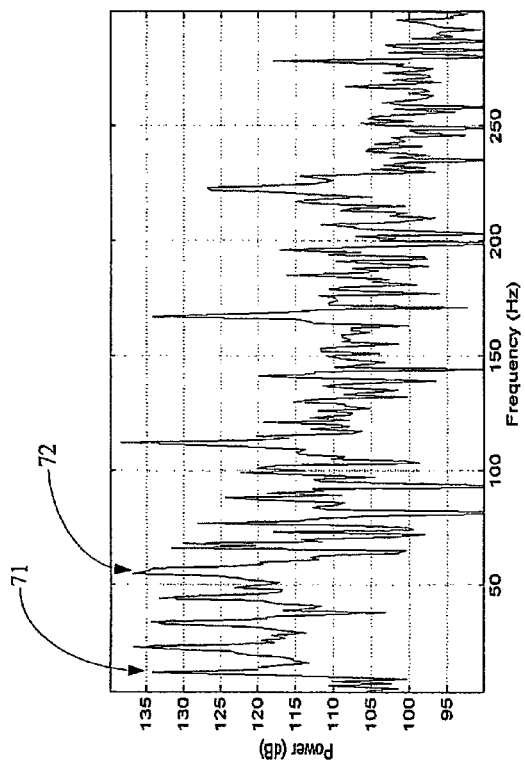
FIG. 7A is a plot of exemplary baseline data, collected according to the preferred method of FIG. 5, reflecting uncalibrated recorded power of the acoustic signature of the preferred helicopter of FIG. 1 for each frequency.
Figure 7B:
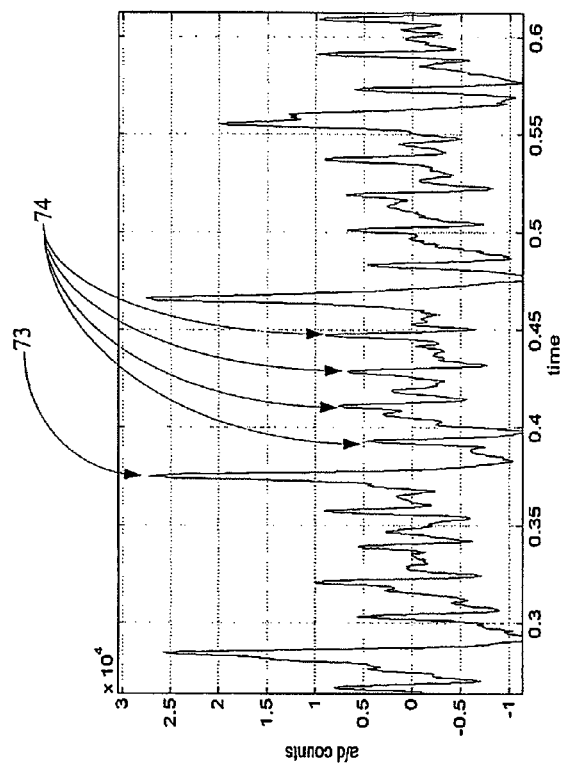
FIG. 7B is a plot of exemplary baseline data, collected according to the preferred method of FIG. 5, reflecting analog-to-digital converted "counts" of the acoustic signature of the preferred helicopter of FIG. 1 over time.

As can be seen from FIG. 7B, the spectrum of the acoustical energy generated by the exemplary UH-1 "Huey" helicopter is dominated by the acoustical noise generated by the helicopter main rotor blades 71. The main rotor blades of a typical helicopter rotate at a near constant speed and produce a coherent acoustical signal. This signal is readily recognizable in the "base-line" data collected. The acoustical noise generated by the tail rotor blades 72 is also readily recognizable.

FIGS. 7A and 7B show the time and frequency response of the amplitude of the acoustic pressure wave produced by a UH1 helicopter flying by a microphone on the ground at a constant speed. Specifically, FIG. 7A is a plot of the uncalibrated recorded power of the UH-1 "Huey" acoustic signature for each frequency (in Hertz). FIG. 7B is a plot of the analog-to-digital converted "counts" of the UH-1 "Huey" acoustic signature over time (in seconds).

The main harmonic from the main rotor blade 73 is at approximately 11 Hz, as shown in FIG. 7A. The time response from the main rotor blade can be approximated by a series of impulses of approximately 0.01 seconds duration, as shown in FIG. 7B (see 73). The first harmonic from the tail rotor blade 72 is at approximately 56 Hz as shown in FIG. 7A, and the time response is the smaller set of impulse-like signals 74 seen in FIG. 7B.

As noted above, the "base-line" data collected from the helicopter flyover is preferably stored by the computer CPU 65 in a database 66. This stored data is then preferably used later to help generate imagery from data collected over the terrain 20.

Returning to FIG. 4, the next steps in the preferred method of imaging terrain is to collect helicopter flight data 43 and helicopter acoustical data 42 as the helicopter 11 flies over a terrain 20 to be imaged. These steps are preferably accomplished at approximately the same time, or very close in time.

Figure 8:
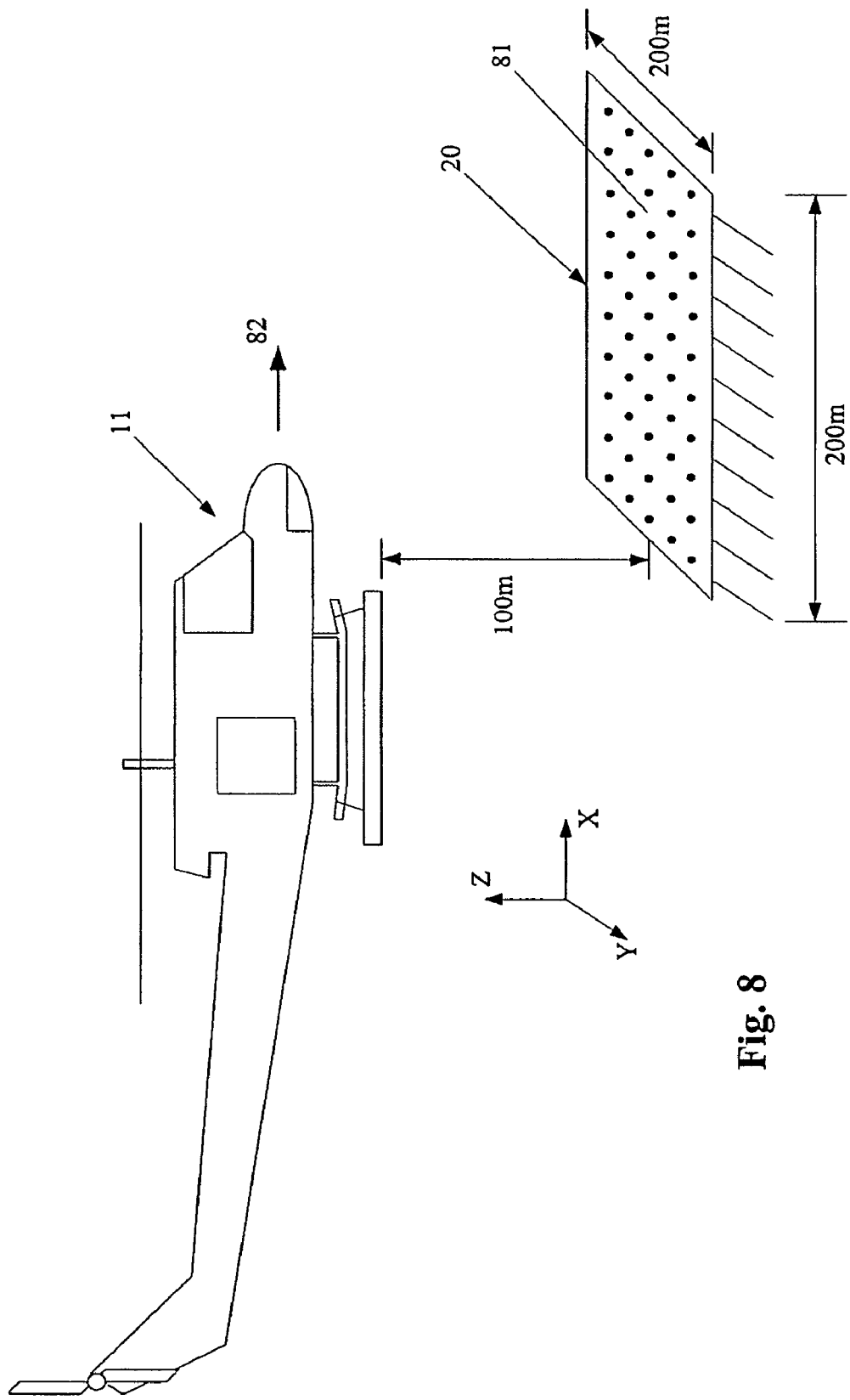
FIG. 8 is a side view of the helicopter of FIG. 1 during collection of imaging data from a terrain to be imaged.

FIG. 8 depicts the helicopter 11 of the preferred embodiment 10 flying over a terrain 20 to be imaged. The terrain 20 to be imaged comprises a grid of data points 81.

In this configuration, the helicopter 11 emits acoustical signals, these signals reflect off of the terrain 20, and the microphone array 28 on the helicopter 11 collects the reflected acoustical data (step 42 in FIG. 4). As will be explained in more detail below, the main rotor 17 and the tail rotor 22 on the helicopter 11 produce the primary acoustic energy that is reflected off the terrain 20 and measured with the microphone array 28.

At approximately the same time as this acoustical data is collected (step 42) by the microphone array 28, the helicopter's position, altitude, attitude, and speed are tracked using the GPS 33 and the IGS 34 referred to above. Of course, other means of collecting the preferred helicopter flight data are possible.

In the next steps (44, 45), both the helicopter flight data and the collected acoustical data are recorded by the computer 30 in a memory/storage device 36 (steps 44 and 45). These steps 44, 45 may happen at approximately the same time, but this timing is not required by the present embodiment.

Returning to FIG. 8, the helicopter 11 is preferably flown over a terrain 20 at a height of about 100 meters. The image formation, or the synthetic aperture, is generated over 200 meters of forward flight by the helicopter 11. The ground surface, or terrain 20, beneath the flight path 82 of the helicopter 11 can be imagined to include a number of grid points 81, as depicted in FIG. 8.

As the helicopter 11 of the preferred embodiment passes over the terrain 20 to be imaged, the helicopter 11 naturally emits an acoustical signature. This acoustical signature echoes from the terrain 20. These acoustical echoes are measured with the microphone array 28 and recorded in the computer system memory 36.

Of course, the sensor array 28, i.e. the microphones 29, on the bottom of the helicopter 11 generally measure the acoustical signal emitted from the helicopter 11 as it is reflected off the terrain 20. However, the sensor array 28 will also measure the acoustical signal generated by the helicopter 11 before the acoustical signal is reflected off of the terrain 20. The latter, direct measurement of the acoustical signal, will be referred to as "self noise." Self noise is generally not helpful in generating an image of the terrain 20, as this portion of the helicopter acoustical signal has no interaction with the terrain 20. Therefore, in the preferred embodiment, the processing of the microphone data preferably begins with the minimization, or complete removal, of the self noise from the data collected by the microphones 29.

As shown in FIG. 4, after the acoustical data and the flight data have been recorded, the next step 46 is preferably to process the recorded data by removing the self noise. Alternatively, the data may be processed as it is received by the CPU 35 of the computer 30, before being recorded into the computer memory 36. Alternatively, and preferably, the data from the microphone array 28 is stored in the memory 36 on the helicopter 11 and is processed after the helicopter 11 has returned to a base and the data moved to another, more powerful computer.

Figure 9:
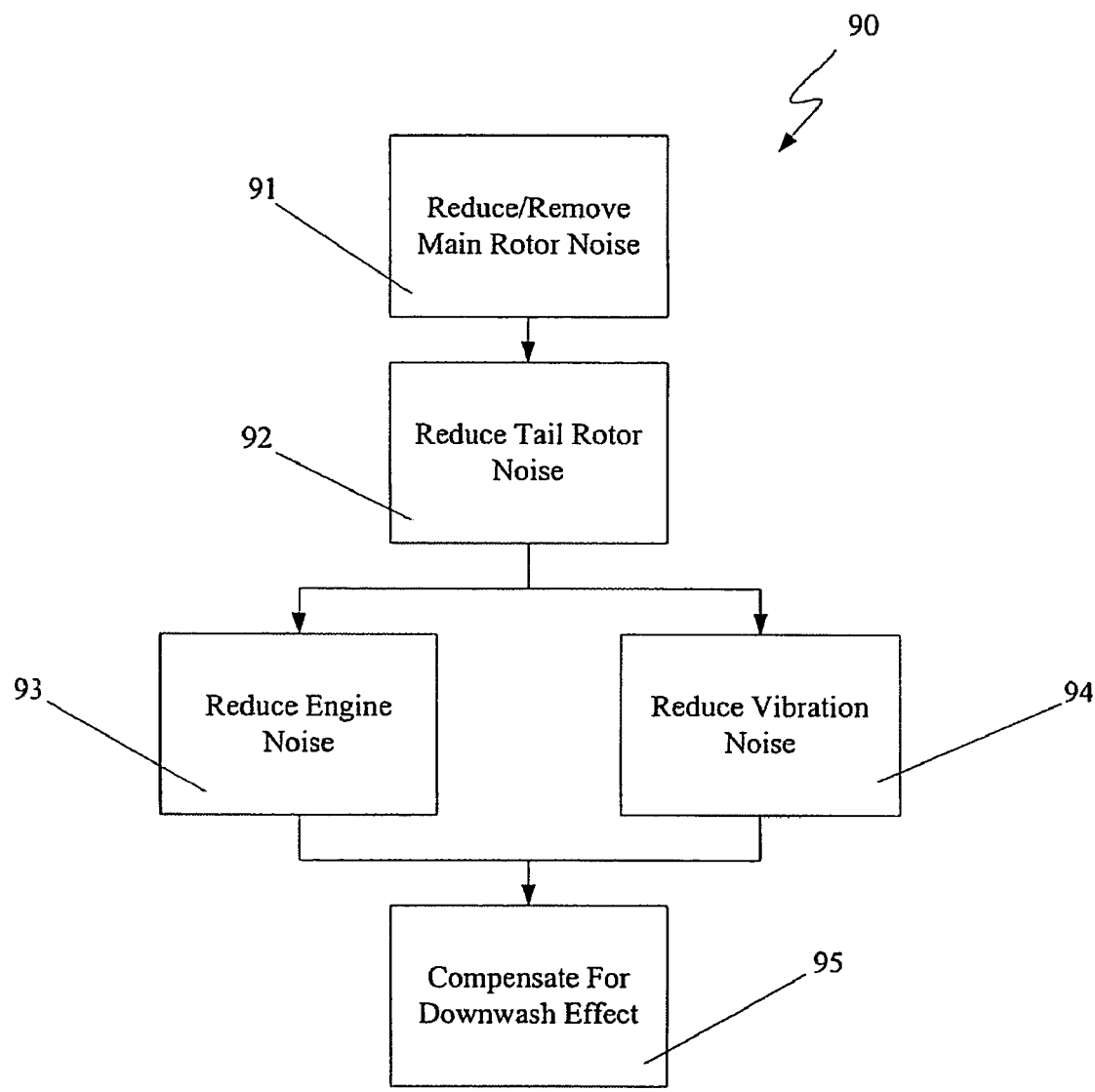
FIG. 9 is a flow chart of the preferred steps implementing a preferred data processing method according to the present disclosure.

Regardless of the timing, the preferred method 90 of processing the data, particularly processing out the self noise, is depicted in FIG. 9. As depicted, the preferred noise removal steps are to remove or reduce main rotor noise 91, remove or reduce tail rotor noise 92, remove or reduce engine noise 93, and remove or reduce vibration noise 94. Of course, these steps do not have to be accomplished in the particular order depicted and any linear operations can be combined. Further, some of these steps may be omitted in certain implementations. For example, it may be possible to omit one or more steps if the level of that particular acoustical noise is relatively low. Additionally, other sources of noise can be removed, if the acoustical data is more finely processed.

Stated differently, the primary sources of acoustical noise are, generally, the rotor blades, engines and other moving parts on the helicopter, vibration noise on the platform, and the wind. There may be other sources that can be removed with additional techniques, or the techniques described below. The preferred noise reduction/removal steps 90 will now be described in greater detail.

The first step in the preferred noise removal methodology 90 is to remove or reduce the self noise from the main rotor 17 (step 91) collected directly from the main rotor 17. The main rotor leakage acoustical signal is preferably reduced by not using the data from the microphones when the self noise is large, or by turning the microphones 29 off during a period when the detected acoustic signal is large. In other words, the data collection device, or computer CPU 35 in the preferred embodiment 10, monitors the signal level, and when this level experiences a significant, dramatic increase, the microphone data is discarded for a brief period of time.

As will be recognized, this preferred method of reducing the main rotor acoustical leakage signal will cause a "blind spot" in the collected acoustical data for a brief period of time. However, this "blind spot" will be filled in as the helicopter 11 moves over the terrain 20 to be imaged. As will be recognized by one of ordinary skill in the art, the basic process of synthetic aperture creation will fill in this data as the helicopter 11 moves along its path. As one example, FIG. 7B shows that for an exemplary UH-1 helicopter, the "blind" region in the data is approximately 0.01 seconds in duration.

Returning to FIG. 9, the next step in the preferred noise reduction method 90 is the reduction of self noise collected by the microphone array 28 from the tail rotor 22 (step 92). One method for reducing this source of acoustical noise is to employ a lowpass filter and filter the data collected by the microphone array 28. The filtering can be applied by the CPU 35 on the helicopter 11 as the data is being collected, or by any computer after the data has been saved to memory 36. A preferred lowpass filter has a cutoff frequency below 56 Hz. As discussed above in relation to FIG. 7A, the first harmonic from the tail rotor is at approximately 56 Hz. However, for the preferred UH-1 helicopter 11 (and possibly many other helicopters), the acoustic signal from the main rotor 17 and the tail rotor 22 cannot be effectively separated to an acceptable degree using a low pass filter because of a significant overlap in the acoustic spectrum of the two acoustic sources. For this reason, using a low pass filter for reducing tail rotor self noise is not preferred, but possible.

As an alternative method of reducing tail rotor noise, the acoustic data could be ignored when the tail rotor noise increases dramatically. This would be similar to the methodology preferred to reduce the main rotor noise. However, the total time response of the tail rotor leakage signal is longer that of the main rotor acoustic signal. Therefore, simply ignoring the data when the tail rotor portion of the acoustical signal increases will also remove a significant portion of the desirable return acoustical signal. In other words, this method will create too great of a "blind spot" in the data for many applications. Again, this method of reducing tail rotor self noise is not preferred, but possible.

Although either of the above-described methods of tail rotor noise reduction may be used, the preferred method for reducing tail rotor noise is to use an adaptive comb filter on the data collected by the microphone array 28. The preferred adaptive comb filter starts filtering data that has a fundamental frequency at approximately 56 Hz. With this approach, the signal reflected from directly below the helicopter will be rejected, but most of the reflected acoustic energy collected by the microphone array 28 will be Doppler-shifted, and therefore, will pass through the filter. Thus, this method does not exhibit the difficulty of creating an excessive blind spot, or of filtering out too much of the reflected main rotor signal.

Figure 10:
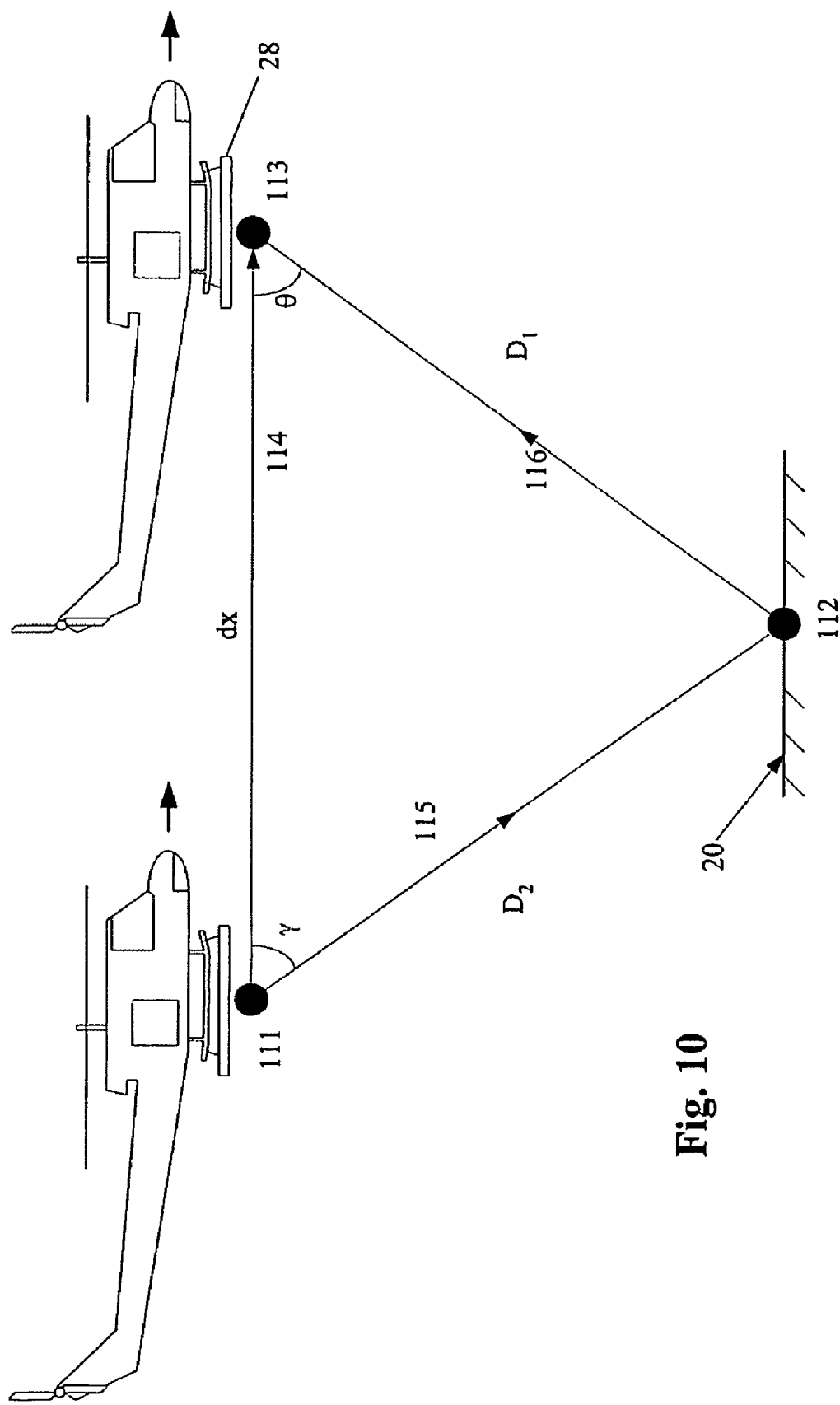
FIG. 10 is a side view of the helicopter of FIG. 1 during collection of imaging data from a specific grid point on a terrain to be imaged.

This can be understood from the following equations, and with reference to FIG. 10. As shown in FIG. 10, the sound, or emitted acoustic signal 115 from the helicopter 11 is emitted at a first point 111. A portion of the emitted acoustical signal 115 strikes the terrain 20 at a certain grid point 112. Then, the reflected acoustic signal 116 is received by the microphone array 28 at a second point 113 some distance further along the helicopter's path of travel 114. The ground 20 will generally introduce a two-way Doppler shift in the reflected acoustic signal 116 approximately equal to:

$$f_d = f_c \frac{2v}{c} \cos\gamma$$

where $f_d$ is the Doppler shift, $f_c$ is the carrier frequency, v is the velocity of the helicopter, c is the velocity of sound, and γ is the angle between the direction of the helicopter 114 and the vector of the sound 115 emitted from the helicopter 11 to a grid point 112 on the ground 20. For example, if v=50 m/s, c=330 m/s, and the maximum value of γ of interest is 45 degrees, then $$\frac{f_d}{f_c} = 0.21.$$

As will be recognized by one of ordinary skill in the art, this result indicates that the Doppler shift is potentially a large percentage of the frequency of the harmonics. See FIGS. 7A and 7B. Therefore, a narrow-band comb filter could be implemented with minimal loss of reflected signal power.

In addition to the above-discussed techniques for reducing the main and tail rotor self noise, the self noise from the rotors 17, 22 can also be reduced by simply shielding the microphones 29 from the direct path of the acoustical signals emitted from the rotors 17, 22. The shape of a windscreen for the microphones 29 can be chosen to do a portion of the shielding. The microphones 29 could also be directional in pick-up. Although the preferred methods described above generally deal with data processing steps, these simple techniques may be used as a stand-alone method or in combination in certain implementations or with certain helicopters.

Lower frequency vibration of the helicopter engines 16 is also a self noise source that the microphone array 28 may collect. It is preferable to also reduce this source of acoustical self noise. As shown in FIG. 9, reduction or removal of engine self noise is the third step 93 in the data processing method 90, and removal or reduction of vibration self noise is the fourth step 94 in the preferred method 90. In the preferred embodiment, the reduction of these types of self noise is accomplished by using two techniques. First, an accelerometer (not depicted) mounted near the microphones 29 and the engine 16 will help estimate the level of these self noise sources. Using the accelerometer as a reference, an adaptive filter using a least-mean-square ("LMS") algorithm can be used to reduce the engine and vibration self noise. Basically, the microphone data is simply run through this adaptive LMS filter. This technique is widely used in many active noise cancellation systems and well known to one of ordinary skill in the appropriate art.

However, due to effects such as turbulence, near-field effects, and diffraction, the relationship between the reference signal created by the accelerometers and the noise will have nonlinear components. For this reason, using an LMS filter alone is not preferred. Another filter is preferably used to further process the microphone 29 data and remove engine 16 and vibration self noise.

Therefore, the output of the LMS filter will be further processed to remove the remaining components. It is known that, in general, most of the self noise sources are coherent acoustical signals, and quickly decorrelate with respect to the reflected acoustical signals (116 in FIG. 10) over time. Knowledge of this fact allows further reductions in the vibration and engine 16 self noise (steps 93 and 94).

First, a spectral analysis is preferably performed on the data collected by each microphone 29a–f after the LMS filter has been applied Then, the frequency, amplitude, and, optionally, a phase of the self noise signals is estimated and a filter is designed to subtract the remaining self noise from the recorded data.

The spectrum can be determined using a variety of techniques. For example, this can be performed by taking fast fourier transforms ("FFTs") of the data and averaging or smoothing them together. For increased accuracy, the FFTs can be padded with zeros. Increased accuracy can also be obtained by using a digital phase-locked-loop. Other super-resolution techniques such as Prony's method or MUSIC could also be applied. Once the noise is characterized, it can be directly subtracted out, or removed with a narrow band filter.

As also shown in FIG. 9, the final step 95 in the data processing method 90 is preferably to compensate for a downwash effect. The effect of the downwash of the main rotor blade 17 is preferably compensated for by first estimating the effect of downwash on the acoustical data gathered by the microphones 29.

The downwash effect is preferably estimated by slowly flying the helicopter over microphones on the ground, similar to the procedure for collecting baseline data discussed above and depicted in FIG. 6. The frequency of the acoustic energy on the ground is compared with the rotation rate of the main rotor blades. The Doppler frequency is estimated using the GPS and IGS information at a particular data collection point. The downwash will create a difference between the estimated and measured Doppler shift. This difference is preferably used to determine an effective average windspeed for the down wash.

Although typically not implemented in the data processing phase 90, it is also preferable to reduce the airflow noise. Airflow noise, which is mostly broadband and random, can be mitigated with windshield designs that can result in a 20 dB improvement. Thus, a specially-adapted microphone that has a windshield design to reduce the airflow noise is preferred.

As noted above, there may be other sources of self noise that the user may wish to remove or reduce from the collected acoustical data. These particular noise sources may depend on the particular rotorcraft used, and/or the particular terrain to be imaged. One of ordinary skill in the art will be able to adapt the above-explained principals in order to reduce noise from an additional source, if one is identified.

Returning to the overall method of the present disclosure, depicted in FIG. 4, once the data has been processed, imagery of the terrain 20 is preferably generated from the remaining acoustical data. The imagery may be generated on board the helicopter 11 as the helicopter 11 flies over the terrain 20. Alternatively, the data may be collected and stored in the memory 36, and then a more powerful computer may be used to perform the imagery.

Regardless of the location of the image-generating computer system, the imagery is preferably generated on a two-dimensional or three-dimensional grid that is at the approximate height of the ground. Also, it is preferred in the present embodiment that the image processing be performed using backprojection techniques in either the time or frequency domain.

The backprojection technique in the time domain is generally more computationally efficient, but use of this technique usually does not account for the frequency-dependent attenuation in the acoustical signal. Alternatively, the imagery may be processed by backprojection techniques in the frequency domain. Such a processing methodology may remedy some of the expected issues involved in time domain backprojection. Both the time and frequency domain techniques will be discussed below.

Range ambiguity for an image based upon a static transmitter is the speed of sound multiplied by the period of the transmit waveform divided by two. For the present described embodiment, however, backprojection techniques in the time and frequency domain both rely on triangulation to resolve any range ambiguities.

Figure 11:
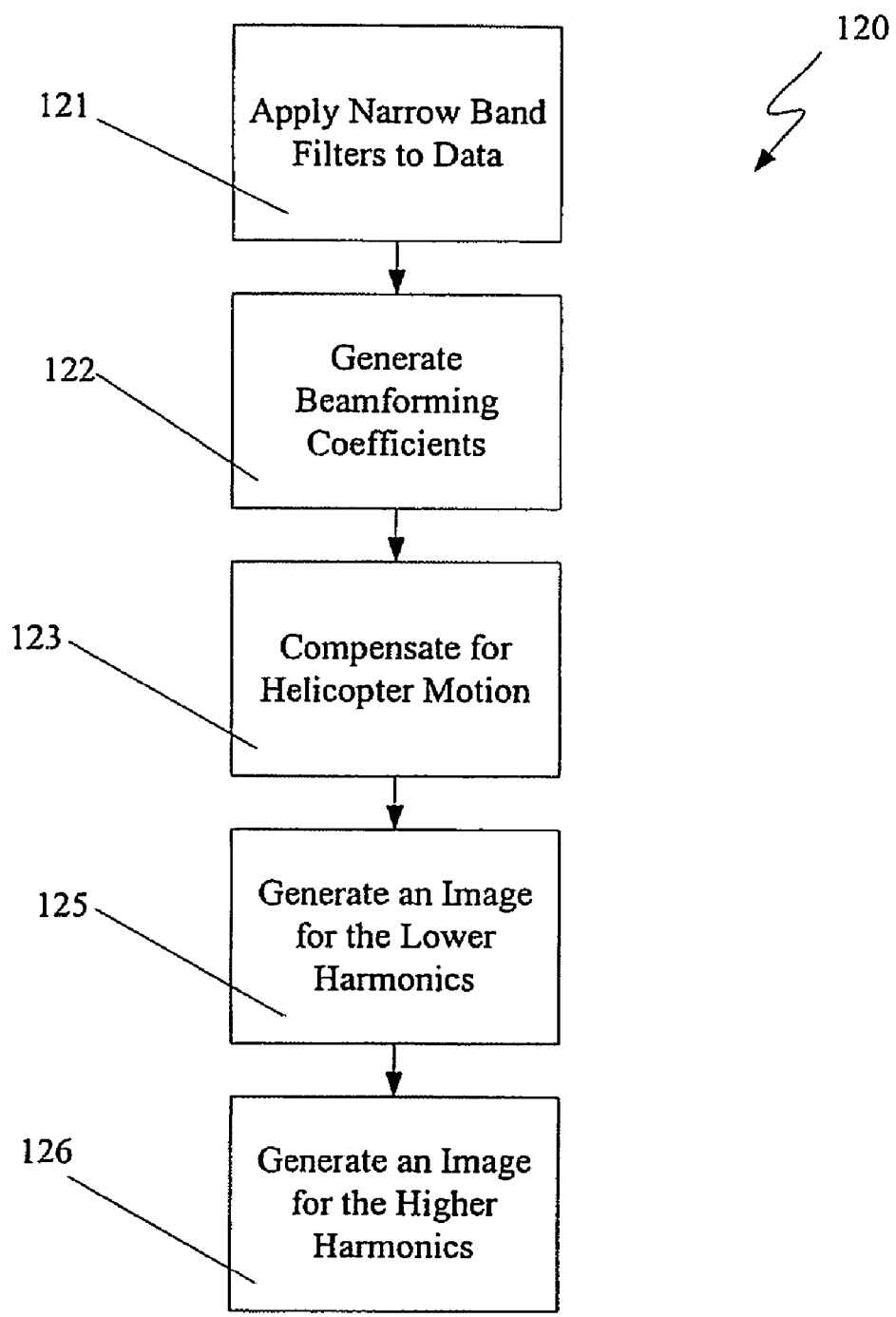
FIG. 11 is a flow chart of the preferred steps implementing a preferred imagining method in the frequency domain according to the present disclosure.

First, backprojection imaging in the frequency domain will be discussed. Generally, the preferred method 120 for processing the microphone data in the frequency domain is depicted in FIG. 11. To process in the frequency domain, narrow band acoustical data is preferred. To generate the desired narrow band data, first, the microphone data is preferably filtered with a series of narrow band filters (step 121). These narrow band filters are preferably designed to operate around the helicopter harmonic frequencies, plus or minus the maximum expected Doppler shifts. Of course, the helicopter harmonic frequency is the fundamental frequency of the helicopter rotor blades, plus all of the associated harmonics of the helicopter.

In the second step 122 of the preferred embodiment 120, for each element of data recorded at a particular time and angle (y from FIG. 10), beamforming coefficients are preferably determined (step 122). The beamforming coefficients are preferably generated using a minimum variance distortionless response (MVDR) algorithm with a pregenerated covariance matrix. The covariance matrix preferably contains the contributions from only the major sources of interference, such as the tail rotor 22 and the engine 16 of the helicopter 11. Because of the usually limited number of sensors, only the major noise sources are typically nulled using MVDR. Because the step of generating the covariance matrix preferably occurs prior to imaging, this step is not depicted in FIG. 11. The beamforming coefficients are determined by applying the MVDR algorithm to the covariance matrix and to the steering vectors associated with each grid point 112 for each analog-to-digital converted sample of the microphone data. Coefficients can be loaded from a look-up table for each steering vector, or calculated for each data set.

To better explain this step 122, specific possible equations are presented below. Specifically, beamforming is preferably performed using the following equation:

$$A_{n,k,f} = (c_{n,k,f}^H X_{n,k,f}) e^{-j\phi_{n,k,f}}$$

where $A_{n,k,f}$ is the amplitude for the $n^{th}$ a/d sample, $k^{th}$ grid point, and the $f^{th}$ frequency harmonic, $C_{n,k,f}$ are the coefficients determined from MVDR for the $k^{th}$ grid point, H is complex conjugate of the transpose, $X_{n,k,f}$ is the filtered data vector from the array of microphones for the $n^{th}$ a/d sample, and $e^{j\phi}n,k,f$ is the phase delay associated with $C_{n,k,f}$. As can be seen, a steering vector changes as a function of frequency and as a function of the grid point on the ground being imaged relative to the position of the helicopter.

The next step (step 123) in the preferred imaging process is to compensate for the motion of the helicopter 11. The motion of the helicopter 11 results in different transmit 115 and receive 116 paths for the acoustical signals generated by the helicopter 11 and received by the microphone array 28. This fact is graphically-depicted in FIG. 10. As can be seen, the path 115 of the acoustical signal from the helicopter 11 to the ground 20 is depicted by $D_1$ and is transmitted at angle γ. The path 116 of the reflected acoustical signal to the helicopter 11 is represented by $D_2$ and is received at angle θ. During the time it takes the acoustical signal to transmit to the ground and reflect back to the helicopter 11, the helicopter 11 has traveled a distance (dx) along its path 114.

The path lengths ($D_1$ and $D_2$) and angles (γ and θ) from the transmit source 111, to the ground 20, and back to the microphone array 28 are determined from the location of the helicopter 11 and the selected grid point 112. The phase and frequency of the transmitted signal 115, $D_1$ is preferably known with a high degree of precision. This is preferably performed by tracking the peak of any of the impulse-like signals, or by bandpass filtering the microphone data or the accelerometer data to obtain a strong harmonic, then using a digital phase-locked loop (PLL).

To further explain motion compensation, exemplary mathematical equations are presented below. Specifically, the motion compensation calculation is preferably performed using the following equation:

$$M_{n,k,f} = A_{n,k,f} e^{-j\left(\psi_{n,k,f} + \left(2\pi \frac{\|\vec{D}_{1,n,k}\|}{\left(c - Vd_{1,n,k} + \vec{V}_w \frac{\vec{D}_{1,n,k}}{\|\vec{D}_{1,n,k}\|}\right)} + \frac{\|\vec{D}_{2,n,k}\|}{\left(c + Vd_{2,n,k} + \vec{V}_w \frac{\vec{D}_{2,n,k}}{\|\vec{D}_{2,n,k}\|}\right)}\right) F_f \left(1 + \frac{(\vec{V}_H + \vec{V}_w)}{c} \cdot \frac{\vec{D}_{2n,k}}{\|\vec{D}_{1,n,k}\|}\right)\right)}$$

where $M_{n,k,f}$ is the motion compensated signal for the $n^{th}$ a/d sample, $k^{th}$ steering vector, and $f^{th}$ frequency, $A_{n,k,f}$ is the amplitude for the nth a/d sample, $k^{th}$ grid point, and $f^{th}$ frequency, $\|\vec{D}_{1,n,k}\|$ is the norm of the vector from the grid point on the ground to the microphone array, $\|\vec{D}_{2,n,k}\|$ is the norm of the vector from the center of the transmit source to a grid point on the ground, $\vec{V}_H$ is the velocity of the helicopter, $\vec{V}_w$ is the velocity of the wind, c is the velocity of the speed of sound, $Vd_{1,n,k}$ and $Vd_{2,n,k}$ are the correction factors for the effective wind speed due to the downwash from the helicopter blades, $F_f$ is the frequency of the $f^{th}$ harmonic of the helicopter, and $\psi_{n,k,f}$ is the motion compensation term to adjust the phase of each frequency to compensate for the motion of the helicopter and starting phase of the transmit frequency.

As is noticed, and discussed above, the exemplary motion compensation equations need the path lengths of the acoustical signals and the angles of the paths as a function of time, grid point, and helicopter velocity. The following equations are preferably used for determining $\|\vec{D}_2\|$ and γ given $\|\vec{D}_1\|$, θ which are a function of the helicopter position 111 and grid point 112, and the helicopter velocity. Again, with reference to FIG. 10, c is the speed of sound, V is the helicopter velocity, $\vec{D}_1$ is the path from the source to the grip point, $\vec{D}_2$ is the path from the grid point to the microphones, and dx is the distance traveled by the helicopter. It is assumed that the helicopter 11 is flying in a straight line at a constant velocity. From FIG. 10, it is seen that $$\frac{\|\vec{D}_1\| + \|\vec{D}_2\|}{c} = \frac{dx}{V} \quad (1)$$

Rearranging to solve for the distance $\vec{D}_2$, one sees that $$\|\vec{D}_2\| = \frac{dxc}{V} - \|\vec{D}_1\| \quad (2)$$

In addition, from FIG. 10, and the common trigonometric relationship of the Cosine Rule, the following relationship is derived:

$$\|\vec{D}_2\|^2 = \|\vec{D}_1\|^2 + dx^2 - 2\|\vec{D}_1\|dx \cos\theta \quad (3)$$

Squaring both sides of the above equation (2), one sees that $$\|\vec{D}_2\|^2 = \left(\frac{dxc}{V} - \|\vec{D}_1\|\right)^2 \quad (4)$$

Then, squaring the right side of equation (4) results in the following relationship:

$$\|\vec{D}_2\|^2 = \|\vec{D}_1\|^2 + \left(\frac{dxc}{V}\right)^2 - \frac{2\|\vec{D}_1\|dxc}{V} \quad (5)$$

Now, setting equation (3) equal to equation (5), yields the following:

$$O = dx^2\left(1 - \left(\frac{c}{V}\right)^2\right) + 2dx\left(\frac{\|\vec{D}_1\|C}{V} - \|\vec{D}_1\|\cos\theta\right) \quad (6)$$

Rearranging equation (6) and dividing out dx yields:

$$dx\left(1 - \left(\frac{c}{V}\right)^2\right) = 2\left(\|\vec{D}_1\|\cos\theta - \frac{\|\vec{D}_1\|c}{V}\right) \quad (7)$$

Solving for dx:

$$dx = 2\left(\|\vec{D}_1\|\cos\theta - \frac{\|\vec{D}_1\|c}{V}\right) / \left(1 - \left(\frac{c}{V}\right)^2\right) \quad (8)$$

The following relationship is also known:

$$\|\vec{D}_1\|\|d\hat{x}\|\cos\theta = d\hat{x} \cdot D_1 \quad (9)$$

from equation (9), one can derive the following relationship:

$$\cos\theta = \frac{d\hat{x} \cdot \vec{D}_1}{1\|\vec{D}_1\|} \quad (10)$$

Again, from FIG. 10, and the Cosine Rule of trigonometry, the following relationship is derived:

$$\|\vec{D}_1\|^2 = \vec{D}_2\|^2 + dX^2 - 2\|\vec{D}_1\|dx\cos\gamma \quad (11)$$

Rearranging, equation (11) yields:

$$\cos\gamma = \frac{\|\vec{D}_2\|^2 + dx^2 - \|\vec{D}_1\|^2}{2\|\vec{D}_1\|dx} \quad (12)$$

Now, dx can be determined from equation (8), γ can be determined from equation (12), and $\|\vec{D}_2\|$ can be determined from equation (2). Generally, the use of narrow band filters on the data creates a phase delay in the data. It is desirable to remove this phase delay. Generally and preferably, this can be accomplished by either multiplying the data by a phase factor or by time-shifting the data to account for the delays in the narrow band filters.

Next, an amplitude correction term is calculated to adjust for propagation loss and the directivity of the source using the following equation:

$$A_{n,k,m} = \frac{G_{n,k,m}}{\|\vec{D}_{1,n,k,m}\|\|\vec{D}_{2,n,k,m}\|}$$

where $A_{n,k,f}$ is an amplitude correction term, $G_{n,k,m}$ is the directivity of the source as a function of angle determined from the helicopter position, grid position, microphone, and time, and the path length terms in the denominator accounts for attenuation in amplitude due to spherical wave propagation.

For the next steps in the preferred imaging method (steps 125 and 126), two images are generated. A first image is generated for the relatively lower frequency harmonics of the helicopter 11 generated by the main rotor blade 17 (step 125) and a second image is generated for the relatively higher frequency harmonics generated by the tail rotor 22 of the helicopter 11 (step 126). To accomplish this preferred step, first, $Q_{n,k}(t_m)$ the "filtered projection," is obtained using the following equation:

$$Q_{n,k}(t_m) = Ff^{-1}\{M_{n,k,f}\|w_f - w_0\|A_{n,k,f}\}$$

where $t_m$ is time or equivalently range bin number, $F^{-1}$ is an inverse DFT, $w_f$ is the frequency of interest, $W_0$ is the start frequency, and $A_{n,k,f}$ is an amplitude correction term.

Next, backprojection imagery is computed using the following equation:

$$g_k(r, \varphi) = \sum_{n=0}^{N-1} Q_{n,k}(r\cos(\varphi - \theta_{k,n}))$$

where $g_k$ is an image of acoustic reflectivity the terrain at polar angle coordinates r and φ relative to the kth grid point, $\theta_{k,n}$ is the angle of the center of the microphone array with respect to the grid point of interest, and $Q_{n,k}(t)$ is obtained at $t=r\cos(\phi-\theta_n)$ from the set of samples $\{Q_{n,k}(t_m)\}$ via interpolation.

Image processing can also be performed in the time domain by summing the product of the data with appropriate delays associated with each grid point and sample time.

The signal processing can be performed using complex variables by applying a Hilbert transform to the measured data and then generating an analytic signal. The time delays are preferably determined from the time that the signals were transmitted, the position of the helicopter 11 as a function of time, path lengths from the transmitter to the receiver, wind, and the effects of the downwash from the helicopter blades. The following exemplary equation shows how to determine $t_{n,k,m}$, the time delay associated with the nth analog-to-digital converted sample of the microphone data, for the kth grid point $g_k(x, y, z)$, and for the mth microphone.

$$t_{n,k,m} = \left(\frac{\|\vec{D}_{1,n,k,m}\|}{\left(c - Vd_{1,n,k} + \vec{V}_w \cdot \frac{\vec{D}_{1,n,k,m}}{\|\vec{D}_{1,n,k,m}\|}\right)} + \frac{\|\vec{D}_{2,n,k,m}\|}{\left(c + Vd_{2,n,k} + \vec{V}_w \cdot \frac{\vec{D}_{2,n,k,m}}{\|\vec{D}_{2,n,k,m}\|}\right)}\right)$$

The image is formed as follows:

$$g_k(x, y, z) = \sum_M \sum_N \frac{X(nT - t_{n,k,m} - \tau_{n,k})G_{n,k,m}}{\|\vec{D}_{1,n,k,m}\|\|\vec{D}_{2,n,k,m}\|}$$

where $X(nT - t_{n,k,m} - \tau_{n,k})$ is the interpolated value of the data measured at time $nT - t_{n,k,m} - \tau_{n,k}$ where n is the a/d sample number, 1/T is the a/d sample rate, $t_{n,k,m}$ is computed from the above equation, $\tau_{n,k,m}$ is the time between when the pulse associated with nth a/d sample, $k^{th}$ grid point, and $m^{th}$ microphone was transmitted relative to start of the reference waveform, $G_{n,k,m}$ is the directivity of the source as a function of angle determined from the helicopter position, grid position, microphone, and time, and the path length terms in the denominator accounts for attenuation in amplitude due to spherical wave propagation.

The pulse repetition interval (PRI), or the period of the transmitted signal, is preferably determined from the accelerometers on the helicopter 11 and/or self noise and using techniques such as PLL.

The theoretical range resolution of the imagery based only upon the bandwidth of the transmitted signal is the speed of sound divided by twice the bandwidth for each set of frequencies (3 and 1 m) and the unambiguous range is the speed of sound divided by the frequency step (15 and 3 m). These results indicate that scatterers are wrapped multiple times in each high resolution profile. However, the ambiguity will preferably be resolved by triangulation and focusing over the entire synthetic aperture and the resolution will be improved.

Figure 12:
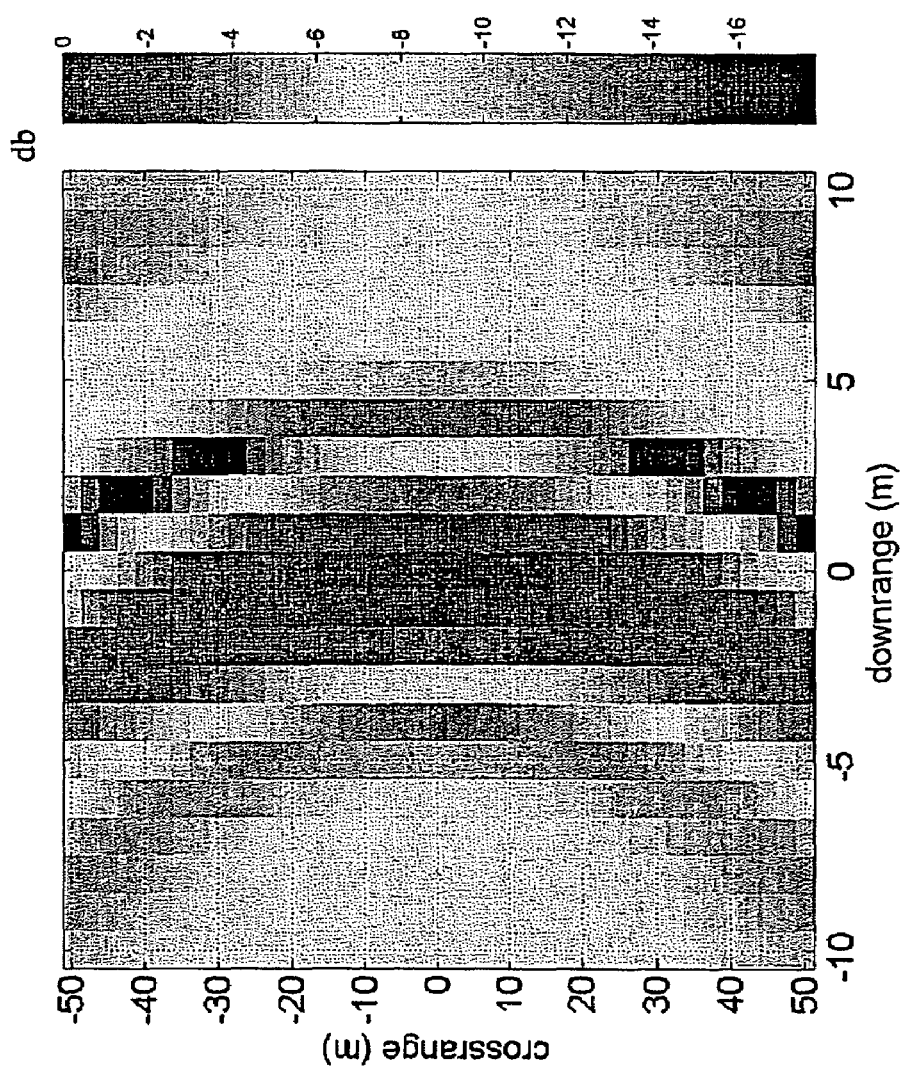
FIG. 12 depicts a plot of an exemplary point spread function for an isotropic scattering center simulated for the major harmonics for the preferred helicopter of FIG. 1 computed in the frequency domain according to the preferred method of FIG. 11.

FIG. 12 shows an exemplary point spread function (PSF) for an isotropic scattering center simulated for the major harmonics for an exemplary UH1 helicopter (FIG. 1) computed in the frequency domain. The depicted PSF result is based upon a simulation using measured transmit pulses that are unambiguous in range. The height of the helicopter is 100 m, velocity is 50 m/s, and the synthetic aperture is 200 m or 4 seconds in duration. These results are not at the maximum theoretical resolution. The PSF is degraded due to the harmonics of the helicopter not being uniform in frequency, and nonuniform signal levels due to attenuation and free space propagation losses.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for generating a terrain image map, comprising:
   an aircraft, wherein said aircraft comprises a rotor;
   an acoustic source, wherein said acoustic source comprises an acoustic signature of said aircraft;
   an acoustic collection device affixed to said aircraft; and
   data processing device for processing data collected by said acoustic collection device.

2. The system of claim 1, wherein said aircraft comprises a helicopter.

3. The system of claim 1, wherein said acoustic collection device comprises at least one microphone.

4. The system of claim 1, wherein said data processing device comprises a microprocessor having software.

5. The system of claim 4, wherein said microprocessor is in said aircraft.

6. The system of claim 5, wherein said software comprises algorithms for the removal of acoustic noise and the imaging of a terrain.

7. A method for imaging a terrain, comprising the steps of:
   providing a rotorcraft;
   affixing an acoustic detection mechanism to said rotorcraft;
   flying said rotorcraft for a distance along a path, said rotorcraft emitting an acoustic energy; and
   detecting said acoustic energy that is reflected off said terrain with said acoustic detection mechanism.

8. The method of claim 7, further comprising the step of processing said detected acoustic energy.

9. The method of claim 8, wherein said processing step comprises the steps of:
   reducing acoustical noise; and
   preparing an image of said terrain from said detected acoustic energy.

10. The method of claim 9, wherein said reducing step comprises the step of removing acoustic noise from a main rotor of said rotorcraft.

11. The method of claim 10, where said removing step comprises the step of discarding said detected acoustic energy when a level of said detected acoustic energy is greatest.

12. The method of claim 9, wherein said reducing step comprises the step of removing acoustic noise from a tail rotor of said rotorcraft.

13. The method of claim 12, where said removing step comprises the step of filtering said detected acoustic energy with an adaptive comb filter.

14. The method of claim 9, wherein said reducing step comprises the step of removing an engine noise and a vibration noise of said rotorcraft.

15. The method of claim 14, wherein said removing step comprises the step of processing said detected acoustic energy with an adaptive LMS filter; and further processing said detected acoustic energy with a narrow band filter.

16. The method of claim 7, wherein said rotorcraft comprises a helicopter.

17. The method of claim 16, wherein said acoustic detection mechanism comprises at least one microphone.

18. The method of claim 17, wherein said acoustic energy comprises a sound emitted by a main rotor of said helicopter.

19. The method of claim 9, wherein said preparing an image step comprises:
   Collecting said reflected acoustic noise into a data in a processor;
   Passing said data through a series of narrow band filters;
   Determining beamforming coefficients of said data;
   Compensating in said data for a motion of said rotorcraft;
   Generating an image related to a lower harmonic of said rotorcraft; and
   Generating an image related to a higher harmonic of said rotorcraft.

20. A method for generating an image of a terrain, comprising the steps of:
   flying a helicopter over a terrain;
   emitting an acoustical energy from said helicopter;
   detecting a portion of said acoustical energy that is reflected from said terrain back to said helicopter;
   processing said detected acoustical energy; and
   creating an image of said terrain from said detected acoustical energy.

21. The method of claim 20, wherein said processing step comprises reducing an acoustical noise.

22. The method of claim 20, wherein said detecting step comprises using an array of microphones on said helicopter to detect said reflected acoustical energy.

* * * * *